US011799259B2

(12) United States Patent
Schley et al.

(10) Patent No.: US 11,799,259 B2
(45) Date of Patent: Oct. 24, 2023

(54) CABLE CUTTER AND CRIMPER

(71) Applicant: Schley Products, Inc., Anaheim Hills, CA (US)

(72) Inventors: Chad Schley, Anaheim Hills, CA (US); Tim Hume, Anaheim Hills, CA (US); Jeff Marshall, Anaheim Hills, CA (US)

(73) Assignee: Schley Products, Inc., Anaheim, CA (US)

( * ) Notice: Subject to any disclaimer, the term of this patent is extended or adjusted under 35 U.S.C. 154(b) by 147 days.

(21) Appl. No.: 16/900,476

(22) Filed: Jun. 12, 2020

(65) Prior Publication Data

US 2020/0395723 A1   Dec. 17, 2020

Related U.S. Application Data

(60) Provisional application No. 62/861,446, filed on Jun. 14, 2019.

(51) Int. Cl.
*H01R 43/042* (2006.01)
*B21F 11/00* (2006.01)
(Continued)

(52) U.S. Cl.
CPC .......... *H01R 43/0421* (2013.01); *B21F 11/00* (2013.01); *B23D 17/04* (2013.01);
(Continued)

(58) Field of Classification Search
CPC ...... B26D 3/16; B26D 21/08; H01R 43/0421; B21F 11/00; B23D 17/04; B23D 29/023;
(Continued)

(56) References Cited

U.S. PATENT DOCUMENTS 2,165,209 A * 7/1939 Baldanza ............... H02G 1/005
30/90.1
2,300,139 A * 10/1942 Stein ...................... B23D 21/08
30/101
(Continued)

FOREIGN PATENT DOCUMENTS

CN    107565442 A    1/2018
CN    109746349 A    5/2019
(Continued)

OTHER PUBLICATIONS

Office Action for Taiwan Patent Application No. 109120106; dated Jul. 7, 2021.

*Primary Examiner* — Ghassem Alie
(74) *Attorney, Agent, or Firm* — Stetina Brunda Garred & Brucker

(57) ABSTRACT

A cable cutter and crimper is provided including an anvil having an anvil cutting edge. A blade is pivotally coupled to the anvil and includes a blade cutting edge. A clevis is coupled to the anvil and includes arms extending on opposite sides of an actuator screw. A pivot nut is threadably coupled to the actuator screw and pivotally coupled to the blade. Rotation of the actuator screw in a first rotational direction causes the pivot nut to translate along the actuator screw in a first translation direction, resulting in the blade cutting edge moving away from the anvil cutting edge. Rotation of the actuator screw in a second rotational direction causes the pivot nut to translate along the actuator screw in a second translation direction, resulting in the blade pivoting relative to the anvil to move the blade cutting edge toward the anvil cutting edge.

20 Claims, 10 Drawing Sheets

(51) Int. Cl.
  *B23D 29/02* (2006.01)
  *H02G 1/00* (2006.01)
  *B26B 17/00* (2006.01)
  *B23D 17/04* (2006.01)

(52) U.S. Cl.
  CPC ............ *B23D 29/023* (2013.01); *B26B 17/00* (2013.01); *H02G 1/005* (2013.01)

(58) Field of Classification Search
  CPC ...... B23D 29/002; B23D 17/02; H02G 1/005; B26B 17/00; B26B 25/005
  USPC ...... 30/92, 101, 93–95, 98, 90.1–90.3, 92.1, 30/102, 97, 347, 2.49, 247, 245, 249, 30/250, 252, 253, 244; 83/580.603, 600, 83/651.1, 950; 81/342, 343.344, 345; 7/107; D8/5, 14, 51, 52, 60, 94, 95; D15/127–129
  See application file for complete search history.

(56) References Cited

U.S. PATENT DOCUMENTS

| | | | | |
|---|---|---|---|---|
| 2,875,518 | A * | 3/1959 | Dyczynski | B23D 21/08 30/102 |
| 2,903,064 | A * | 9/1959 | Blonder | H02G 1/1229 30/233 |
| 2,921,369 | A * | 1/1960 | Stanley | B23D 21/08 30/102 |
| 3,885,309 | A * | 5/1975 | Lund | B23D 29/023 D8/52 |
| 4,178,682 | A | 12/1979 | Sadauskas | |
| 4,587,732 | A | 5/1986 | Lind et al. | |
| 5,067,240 | A * | 11/1991 | You | B23D 17/02 30/247 |
| 5,099,577 | A * | 3/1992 | Hutt | B23D 21/08 30/97 |
| 2003/0110642 | A1 | 6/2003 | Still | |
| 2006/0179662 | A1* | 8/2006 | Holliday | H02G 1/1224 30/90.1 |
| 2018/0109084 | A1* | 4/2018 | Smith | H02G 1/005 |

FOREIGN PATENT DOCUMENTS

| | | |
|---|---|---|
| TW | M406869 U | 7/2011 |
| TW | I640188 | 11/2018 |

* cited by examiner

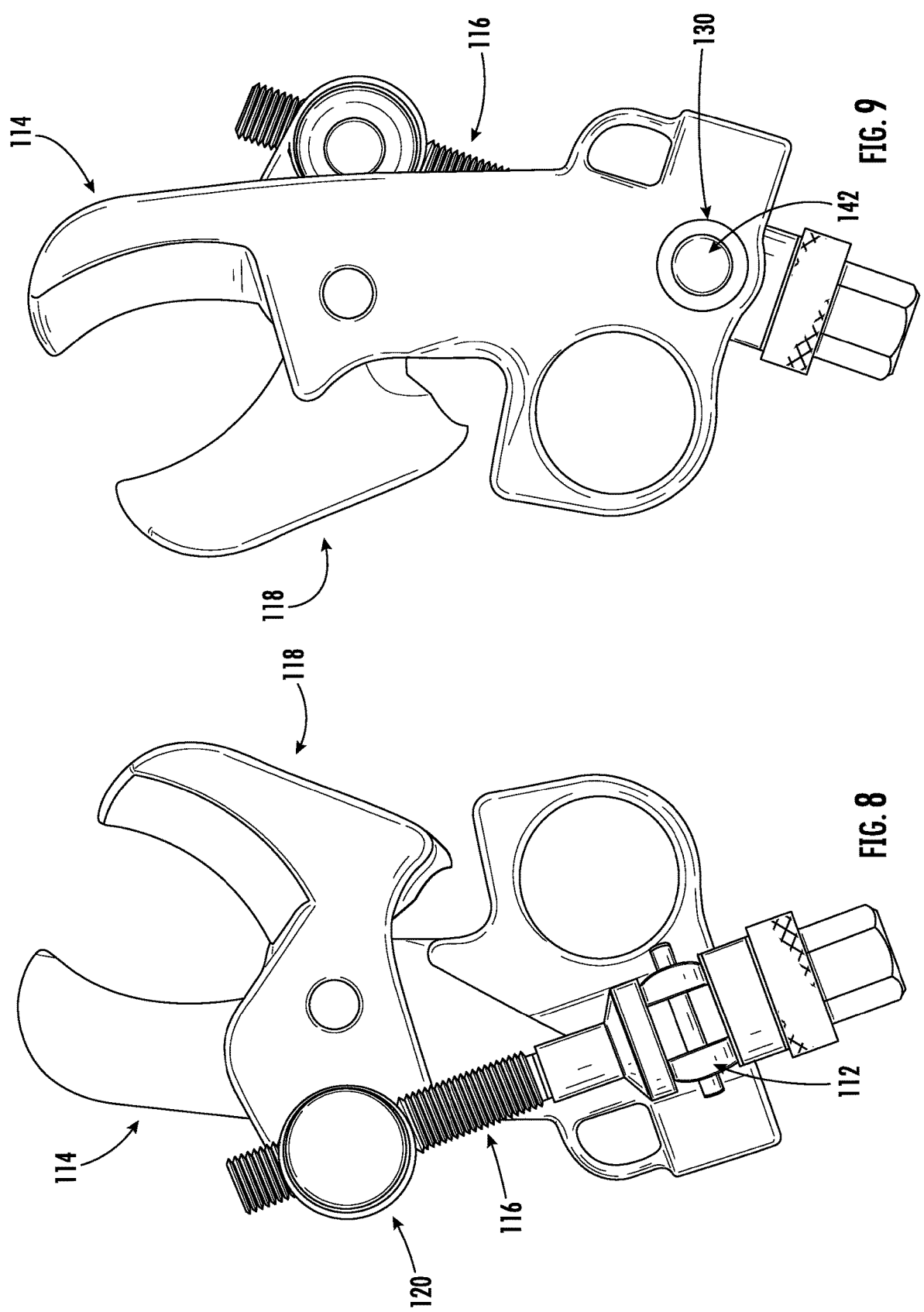

CABLE CUTTER AND CRIMPER

CROSS-REFERENCE TO RELATED APPLICATIONS

This application claims priority to U.S. Application Ser. No. 62/861,446, filed Jun. 14, 2020, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to a cable cutter and crimper, and more specifically to a cable cutter and crimper actuated by a screw or other modality which is adapted to provide greater leverage as needed to complete a cutting process.

2. Description of the Related Art

Conventional cable cutters are tools having a pair of metal bodies which pivot relative to each other to perform the desired cable cutting action. Each metal body may include a handle, such that a user may manually grip both handles with a single hand. The handles may be squeezed together to impart the force needed to cut through the cable. The force on the handles may be relaxed once the cutting is complete.

While conventional cable cutters may be useful for cutting through smaller cable, thicker cable, such as car battery cable, may present a challenge. Indeed, larger cable may require more force to cut through the cable. Conventional cable cutters may not provide the leverage needed to easily generate sufficient cutting force. Along these lines, if the cutting force is large enough that the user over-exerts himself, the user may lose control over the cable cutters, which may lead to injury, or damage to the cable. Furthermore, the elongate configuration of the handles on conventional cable cutters may make it difficult to use the cable cutters in confined spaces.

Accordingly, there is a need in the art for a cable cutter that is easily actuatable and capable of safely generating the force needed to cut through a thicker cable not well suited for cutting with a conventional cable cutter. Various aspects of the present disclosure address this particular need, as will be discussed in more detail below.

BRIEF SUMMARY

In accordance with one embodiment of the present disclosure, there is provided a cable cutter and crimper comprising an anvil having an anvil cutting edge. A blade is pivotally coupled to the anvil and includes a blade cutting edge. An actuator screw is moveably coupled to the anvil and the blade. A clevis coupled to the anvil and includes a pair of arms extending on opposite sides of the actuator screw for coupling the actuator screw to the anvil. A pivot nut is threadably coupled to the actuator screw and pivotally coupled to the blade. Rotation of the actuator screw relative to the pivot nut in a first rotational direction causes the pivot nut to translate along the actuator screw in a first translation direction, resulting in the blade pivoting relative to the anvil to move the blade cutting edge away from the anvil cutting edge. Rotation of the actuator screw relative to the pivot nut in a second rotational direction causes the pivot nut to translate along the actuator screw in a second translation direction, resulting in the blade pivoting relative to the anvil to move the blade cutting edge toward the anvil cutting edge.

The clevis may be integrally formed with the anvil.

The clevis may be pivotally coupled to the anvil.

The anvil may include an anvil main body and an anvil cutting element detachably engagable with the anvil main body, with the anvil cutting element defining the anvil cutting edge. The blade may include a blade main body and a blade cutting element detachably engageable with the anvil main body, with the blade cutting element defining the blade cutting edge.

The blade main body may include a collar defining a collar opening. The pivot nut may be receivable within the collar opening and may be pivotable therein. The collar opening may include a pair of opposed slots sized to accommodate the actuator screw.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 8 is a front view of the cable cutter and crimper of FIG. 5 in the open position;

FIG. 9 is a rear view of the cable cutter and crimper of FIG. 5 in the open position;

Common reference numerals are used throughout the drawings and the detailed description to indicate the same elements.

DETAILED DESCRIPTION

Figure 1:
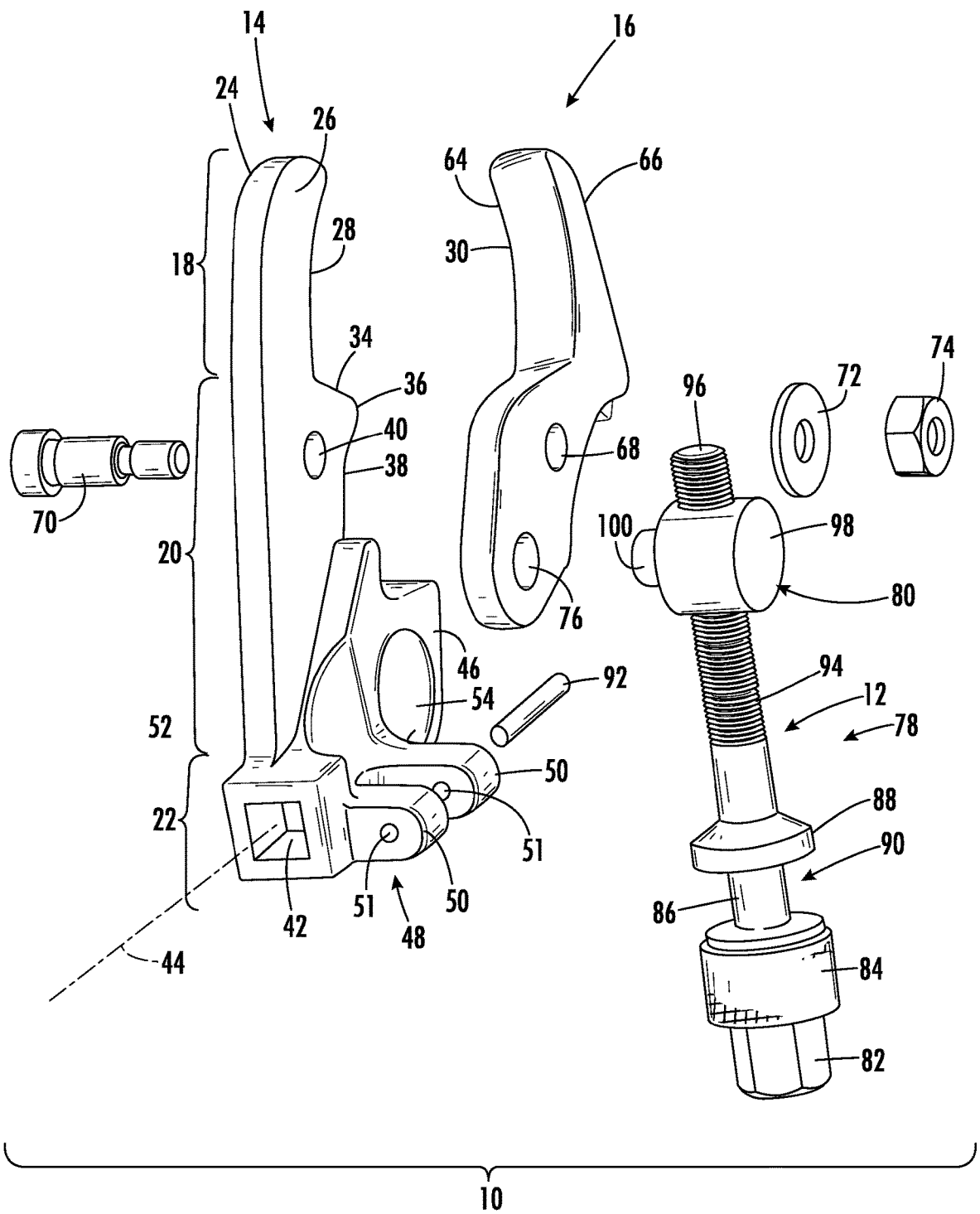
FIG. 1 is an exploded perspective view of a first embodiment of a cable cutter and crimper having an integral clevis.
Figure 2:
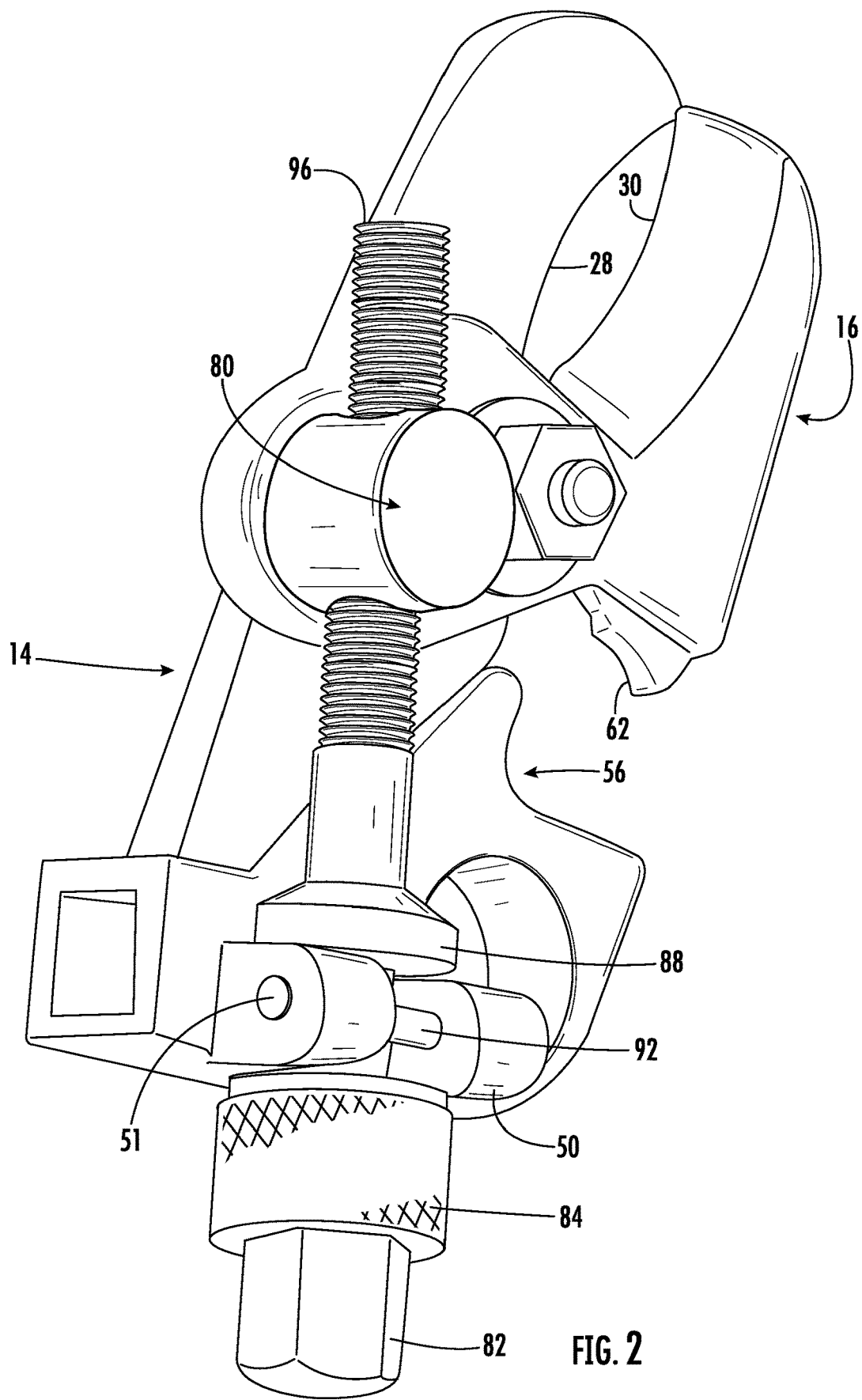
FIG. 2 is an upper perspective view of the cable cutter and crimper in a partially closed position.
Figure 3:
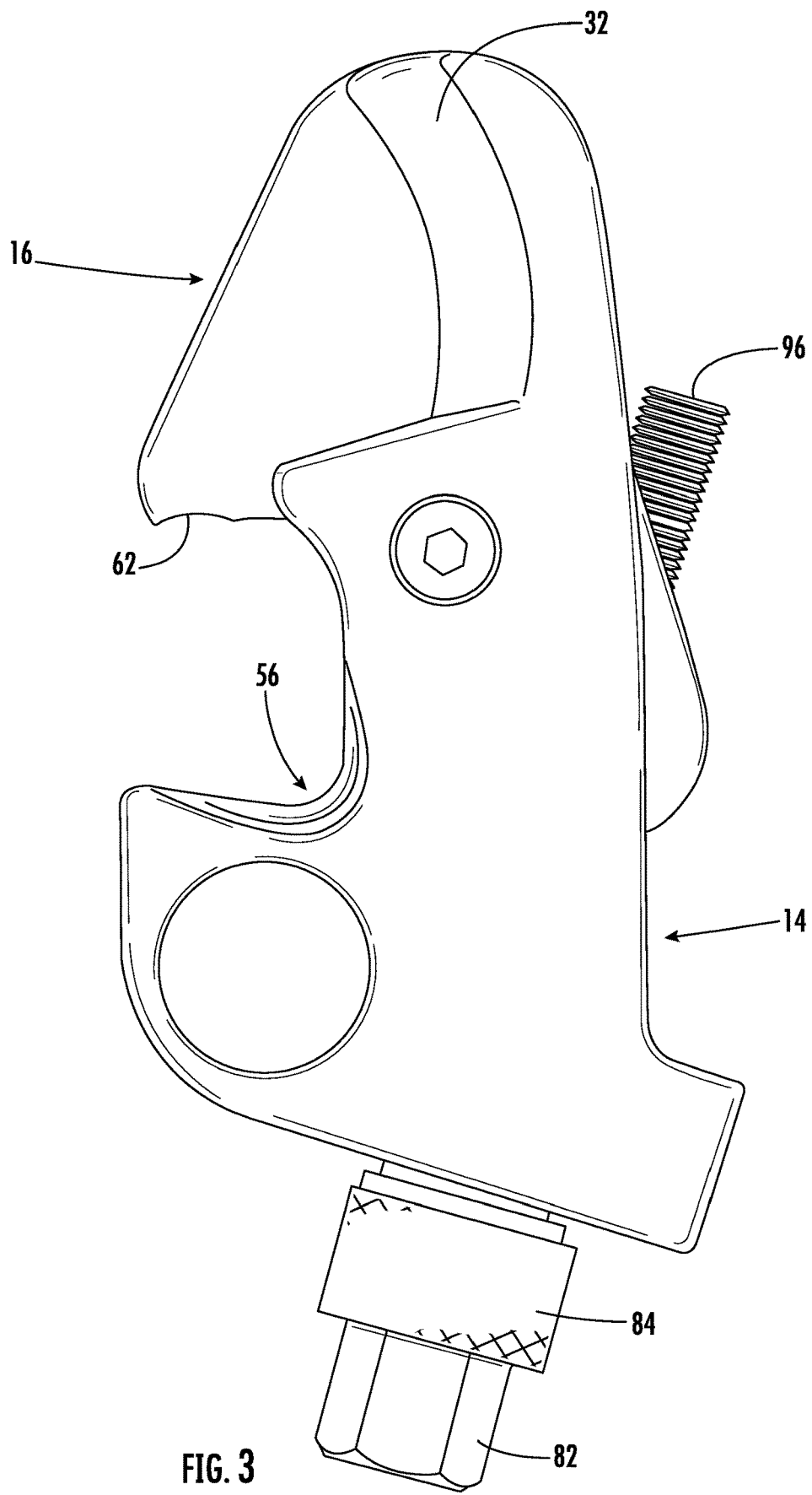
FIG. 3 is a front view of the cable cutter and crimper in a fully closed position.
Figure 4:
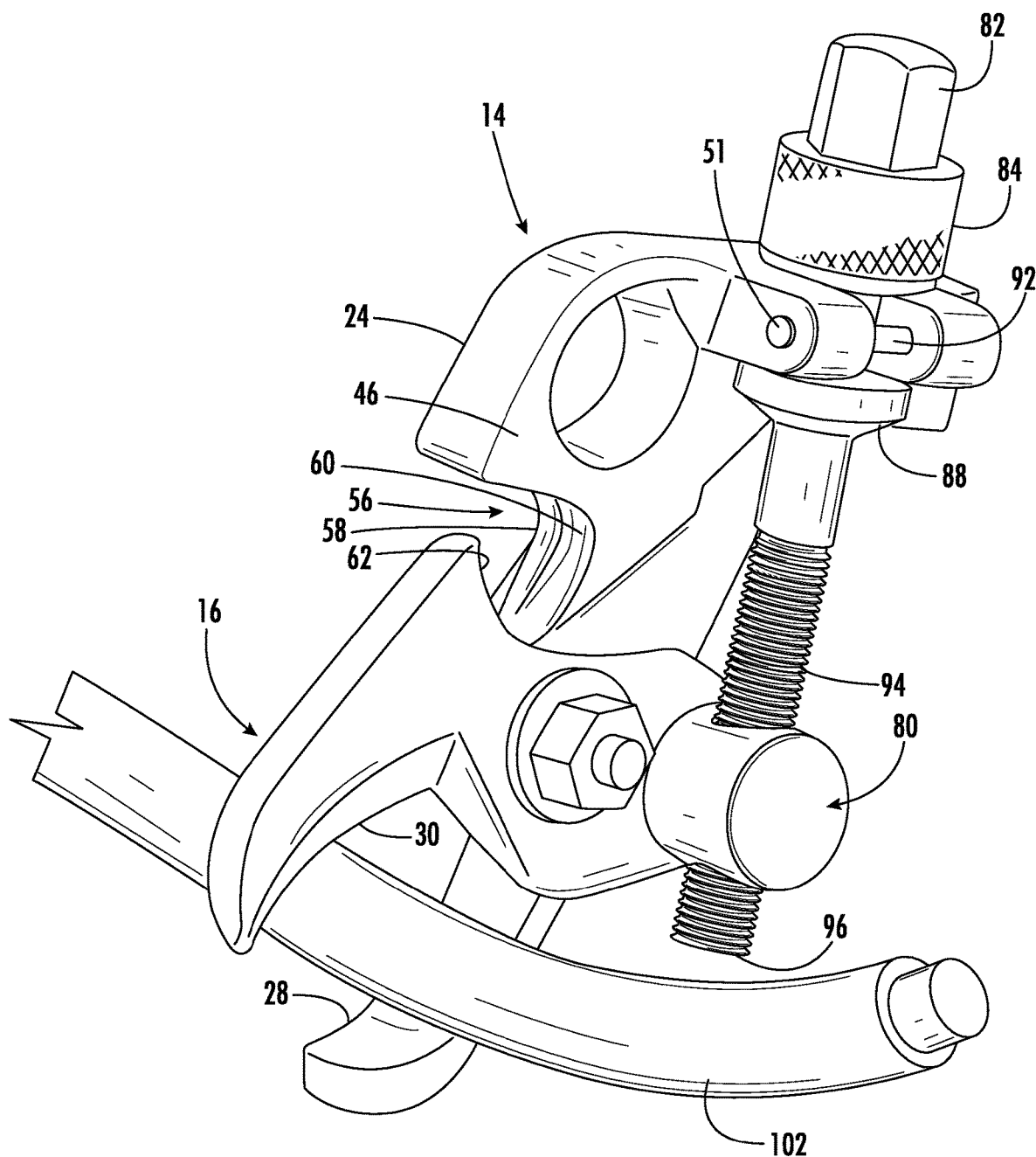
FIG. 4 is an upper perspective view of the cable cutter and crimper in use.
Figure 5:
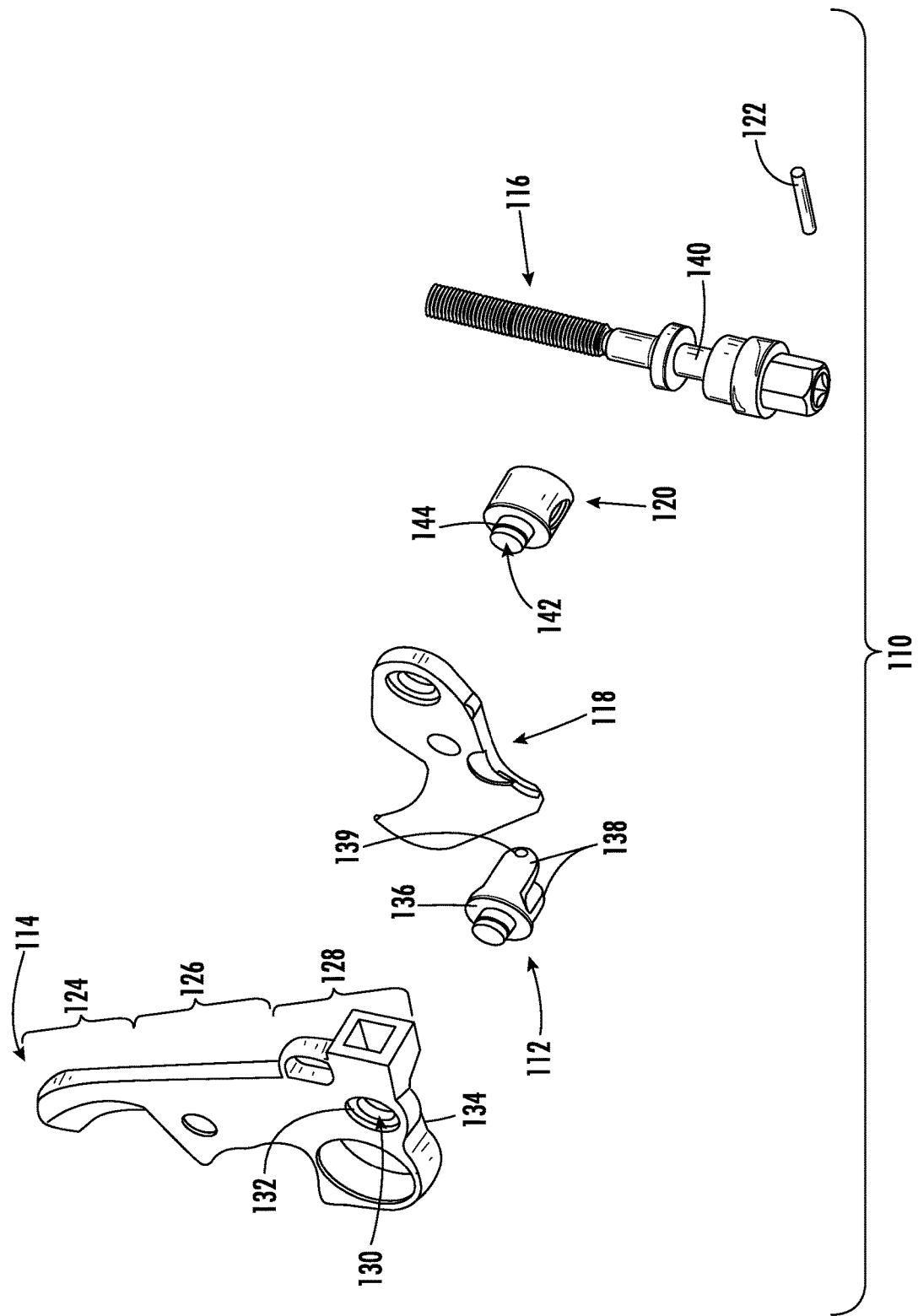
FIG. 5 is an exploded lower perspective view of a second embodiment of a cable cutter and crimper having a pivot clevis.
Figure 7:
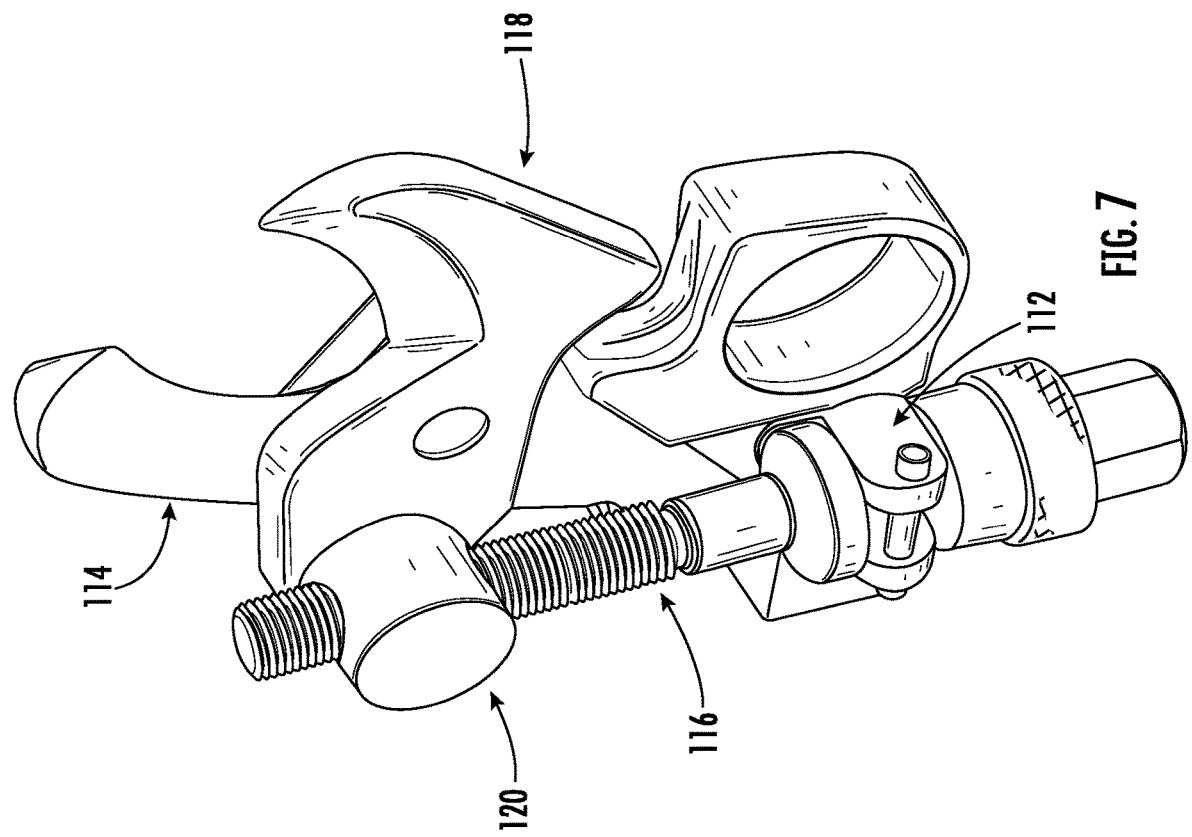
FIG. 7 is a second side perspective view of the cable cutter and crimper of FIG. 5 in the open position.
Figure 6:
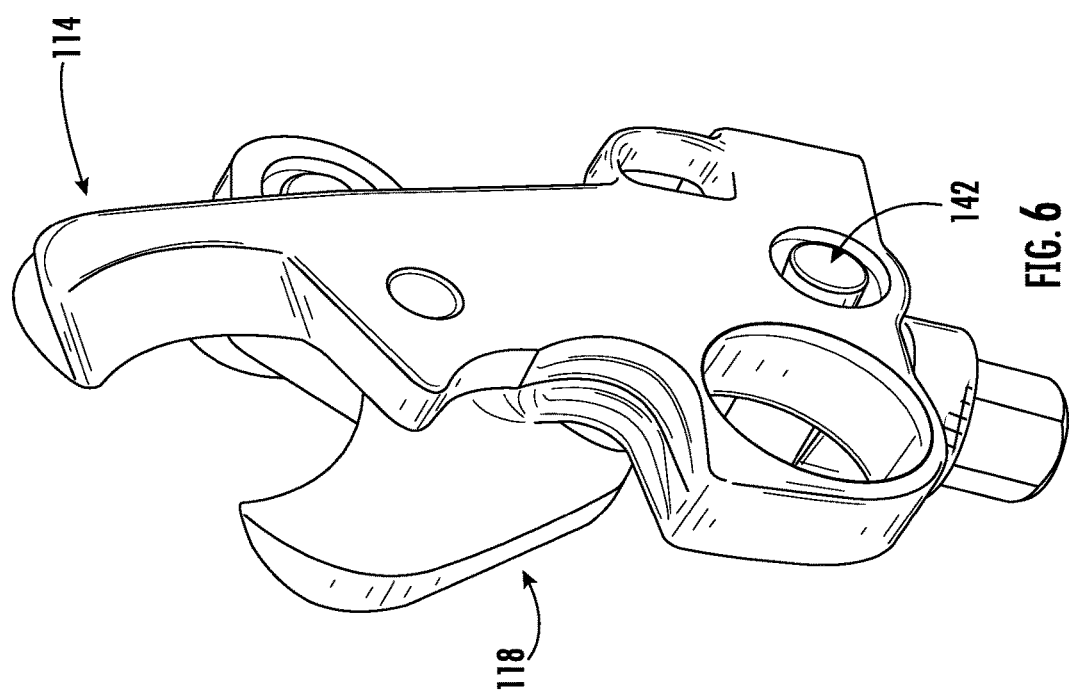
FIG. 6 is a first side perspective view of the cable cutter and crimper of FIG. 5 in an open position.

The detailed description set forth below in connection with the appended drawings is intended as a description of certain embodiments of a cable cutter and crimper and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now to FIGS. 1-4, there is depicted a first embodiment of a cable cutter and crimper 10 having a unique scissor action to perform cable cutting as well as cable crimping. A threaded actuator screw 12 may be used to actuate a smooth motion of the cable cutter and crimper 10 between open and closed positions. The configuration of the cable cutter and crimper 10 may be ideal for technicians servicing wire or cables in tight, confined areas, such as cables that may be attached to vehicles. Indeed, the cable cutter and crimper 10 may be formed without elongate handles common in conventional cable cutters, and instead, may rely on actuation via the actuator screw 12 or a similarly functioning actuator modality. The ability to operate the cable cutter and crimper 10 in confined spaces may also make the cable cutter and crimper 10 ideal for work in an assembly line, a stereo shop, an aircraft, a boat, heavy equipment, as well as use with welding cables.

The cable cutter and crimper 10 generally includes an anvil (e.g., a first body) 14 and a blade (e.g., a second body) 16 pivotally connected to the anvil 14. The anvil 14 itself may generally include a cutting portion 18, a central portion 20, and base portion 22. A first surface 24 may extend across the cutting portion 18, the central portion 20 and the base portion 22, and a second surface 26 may extend opposite the first surface 24 across the cutting portion 18 and the central portion 20. The second surface 26 at least partially defines an anvil cutting edge 28 that cooperates with a blade cutting edge 30 formed on the blade 16, as will be described in more detail below. The anvil 14 may include a tapered surface 32 at least partially defining the anvil cutting edge 28 and extending between the first surface 24 and second surfaces 26.

The central portion 20 of the anvil 14 may include a forward face 34 that extends from the anvil cutting edge 28 and terminates at an anvil apex 36. A curved edge 38 may extend from the anvil apex 36 away from the forward face 34. The central portion 20 of the anvil 14 may further include an anvil opening 40 extending from the first surface 24 to the second surface 26 to facilitate connection with the blade 16, as will be described in more detail below.

The base portion 22 of the anvil 14 may include a cavity 42 extending into base portion 22 along a cavity axis 44, with the cavity 42 being sized to facilitate engagement between the anvil 14 and an extension tool for extra leverage or support when using the cable cutter and crimper 10. For instance, the cavity 42 may be sized to receive a portion of the extension tool, such that the extension tool is frictionally engaged with the anvil 14. According to one embodiment, the cavity 42 is a ⅜ inch square cavity, although the size and configuration of the cavity 42 may vary without departing from the spirit and scope of the present disclosure.

The base portion 22 may be thicker than the cutting portion 18 and the central portion 20, and thus, may define a third surface 46 that is separated from the second surface 26. The base portion 22 may further include an integral clevis 48 having a pair of arms 50 extending along respective axes, which are generally perpendicular to a plane defined by the third surface 46. The arms 50 may be separated from each other in a direction generally parallel to the recess axis 44. Each arm 50 may include an opening 51, which is co-axially aligned with the opening 51 in the opposite arm 50. An arcuate groove 52 may extend into the base portion 22 from the third surface 46, with the arcuate groove 52 defining a radius about an axis extending generally perpendicular to the cavity axis 44.

The base portion 22 may further include an opening 54 extending from the third surface 46 to the first surface 24. The opening 54 may serve as a finger-grip to grab onto the cable cutter and crimper 10 or stabilize the cable cutter and crimper 10 during use. In the exemplary embodiment, the opening 54 is circular, although the opening 54 may also define other shapes.

The base portion 22 may further include an anvil crimping element 56, which in the exemplary embodiment, is formed adjacent the cutting portion 18 and extends between the first surface 24 and the third surface 46. The anvil crimping element 56 may include a first rib 58 adjacent the first surface 24 and a second rib 60 adjacent the third surface 46. A crimping cavity may be located between the first and second ribs 58, 60, and may receive a cooperative crimping body 62 formed on the blade 16. The crimping elements 56, 62 may cooperate to crimp cable terminal ends onto cables up to 2/0 AWG.

The blade 16 includes a first surface 64 and a second surface 66, with the blade cutting edge 30 being at least partially defined by a peripheral portion of the first surface 64. The blade cutting edge 30 cooperates with the anvil cutting edge 28 to perform wire cutting when the blade 16 pivots relative to the anvil 14. The blade 16 further includes a blade opening 68 extending between the first and second surfaces 64, 66. A shoulder bolt 70 may be advanced through the aligned anvil opening 40 and blade opening 68 and secured thereto with a washer 72 and hex nut 74 to connect the blade 16 to the anvil 14, while also allowing the blade 16 to pivot relative to the anvil 14 about the shoulder bolt 70.

The blade 16 may additionally include a secondary opening 76 extending between the first and second surfaces 64, 66. The secondary opening 76 may be spaced from the blade opening 68 in a direction that is generally diametrically opposed from the blade cutting edge 30. The secondary opening 76 may be sized to receive at least a portion of an actuator mechanism 78 for driving the pivotal motion of the blade 16 relative to the anvil 14.

The anvil 14 and the blade 16 may be formed from high quality heat treated alloy steel, although other materials known in the art may also be used without departing from the spirit and scope of the present disclosure.

According to one embodiment, the actuator mechanism 78 includes the actuator screw 12 and a pivot nut 80 operatively coupled to the actuator screw 12. The actuator screw 12 may include a hex-head 82 and a cylindrical body 84 having a knurled outer surface. The hex-head may be a 14 mm, ⁹⁄₁₆" hex-head. A first shaft portion 86 may extend from the cylindrical body 84 away from the hex-head 82. A flange 88 may extend outwardly from the first shaft portion 86 in spaced relation to the cylindrical body 84 to define a void 90 around the first shaft portion 86 between the flange 88 and the cylindrical body 84. The void 90 may be sized to accommodate a portion of the clevis 48 on the anvil 14, while also allowing for a prescribed amount of linear and/or pivotal movement of the actuator screw 12 relative to the clevis 48, the importance of which will be described in more detail below. A roll pin 92 may be advanced through aligned openings 51 on the clevis 48 to retain the actuator screw 12 to the clevis 48.

A second shaft portion 94 extends from the flange 88 away from the first shaft portion 86, with the second shaft portion 94 including a threaded segment extending from a distal end 96 thereof toward the flange 88. The second shaft portion 94 may be a heated treated fine thread segment. The threaded segment is threadably connected to the pivot nut 80, such that relative rotation between the second shaft portion 94 and the pivot nut 80 allows the pivot nut 80 to translate along the second shaft portion 94.

The pivot nut 80 includes a main body 98 and a boss 100 extending from the main body 98. The main body 98 may include an internally threaded opening extending through the main body 98 and sized to engage with the second shaft portion 94. The boss 100 protrudes from the main body 98 in a direction that is generally perpendicular to threaded opening, with the boss 100 being sized to engage with the secondary opening 76 on the blade 16 for securing the pivot nut 80 to the blade 16.

With the basic structure of the cable cutter and crimper 10 described above, the following discussion relates to an exemplary use of the cable cutter and crimper 10. When the cable cutter and crimper 10 is in an open position, the anvil cutting edge 28 is moved away from the blade cutting edge 30, which allows a cable 102 (see FIG. 4) to be inserted therebetween for cutting.

The cable cutter and crimper 10 may be transitioned from the open position toward a closed position to move the blade cutting edge 30 toward the anvil cutting edge 28. The movement may be effectuated through rotation of the actuator screw 12 in a first rotational direction, which may be facilitated through the use of a wrench or similar tool engageable with the hex-head 82. As the actuator screw 12 is rotated in the first rotational direction, the pivot nut 80 is moved away from the distal end 96 of the actuator screw 12, and toward the flange 88. Such movement of the pivot nut 80 results in the secondary opening 76 to pivot about the blade opening 68 in a first pivot direction, which moves the blade cutting edge 30 toward the anvil cutting edge 28. Since the distance between the secondary opening 76 and the blade opening 68 is fixed, the secondary opening 76 moves in an arcuate motion relative to the anvil 14. Consequently, the pivot nut 80 and the second shaft portion 94 of the actuator screw 12 also move in an arcuate motion.

To transition the cable cutter and crimper 10 from the closed position toward the open position, the actuator screw 12 is rotated in a second rotation direction, which is opposite to the first rotational direction, and which results in the pivot nut 80 moving toward the distal end of the actuator screw 12, away from the flange 88. Such movement of the pivot nut 80 results in the secondary opening 76 to pivot about the blade opening in a second pivot direction, which moves the blade cutting edge 30 away from the anvil cutting edge 28.

The spacing between the flange 88 and the cylindrical body 84 of the actuator screw 12, which is larger than the clevis 48, allows for a certain degree of float of the actuator screw 12 relative to the clevis 48, such that the actuator screw 12 may pivot or otherwise slightly shift position relative to the anvil 14 as the cable cutter and crimper 10 transitions between the open and closed position.

The cable cutter and crimper 10 may be capable of cut up to 4/0 AWG copper or aluminum cable Referring now to FIGS. 5-9, there is depicted another embodiment of a cable cutter and crimper 110, which differs slightly from the embodiment described above. The primary distinction is that clevis 112 in the cable cutter and crimper 110 is not integrally formed with anvil 114, and instead, is capable of pivoting relative to the anvil 114 to accommodate the pivoting motion of actuator screw 116 as the cable cutter and crimper 110 transitions between the open and closed positions.

In addition to the anvil 114 and pivot clevis 112, the cable cutter and crimper 110 additionally include a blade 118, a pivot nut 120, the actuator screw 116, and a roll pin 122, which are similar to the blade 16, pivot nut 80, actuator screw 12, and roll pin 92 described above. With regard to the anvil 114, the structure is very similar to the anvil 14 described above, with the anvil 114 including a cutting portion 124, a central portion 126, and a base portion 128. The cutting portion 124 and the central portion 126 of the anvil 114 are similar to the cutting portion 18 and central portion 20 of the anvil 14 described above. However, the base portion 128 of the anvil 114 differs. In particular, the base portion 128 includes a pivot opening 130 extending through the anvil 114 between the opposed surfaces thereof. The pivot opening may have a stepped configuration at one end to define a first diameter 132 larger than a recessed second diameter 134.

The pivot clevis 112 is separate from the anvil 114 and includes a base surface 136 and a pair of arms 138 extending along respective axes generally perpendicular to the base surface 136. The spacing between the arms 138 may be smaller than the spacing between the arms 50 of the clevis 48 described above. In particular, the arms 138 may be spaced by a distance which is substantially equal to the outer diameter of the first segment 140 of the actuator screw 116, to allow the actuator screw 116 to snugly fit within the arms 138. Each arm 138 includes an opening 139, which is co-axially aligned with the opening 139 in the opposite arm 138 to accommodate the roll pin 122 to secure the actuator screw 116 within the pivot clevis 112.

The pivot clevis 112 additionally includes a boss 142 having a circular protrusion 144 formed in a distal region of the boss 142, i.e., that portion of the boss 142 furthest from the base surface 136. The boss 142 is insertable into the pivot opening 130, such that the circular protrusion 144 formed on the distal portion of the boss 142 extends into the portion of the pivot opening 130 associated with the first diameter 132, i.e., the larger portion of the pivot opening 130. The circular protrusion 144 is preferably formed so as to prevent inadvertent removal of the pivot clevis 112 from the pivot opening 130, while also allowing the pivot clevis 112 to pivot relative to the anvil 114.

During use of the cable cutter and crimper 110, rotation of the actuator screw 116 in a first rotational direction causes the blade 118 to pivot relative to the anvil 114 in a first pivot direction, and the pivot clevis 112 to also pivot relative to the anvil 114 in a first pivot direction. Conversely, rotation of the actuator screw 116 in a second rotational direction causes the blade 118 to pivot relative to the anvil 114 in a second pivot direction, and the pivot clevis 112 to also pivot relative to the anvil 114 in a second pivot direction.

Figure 10:
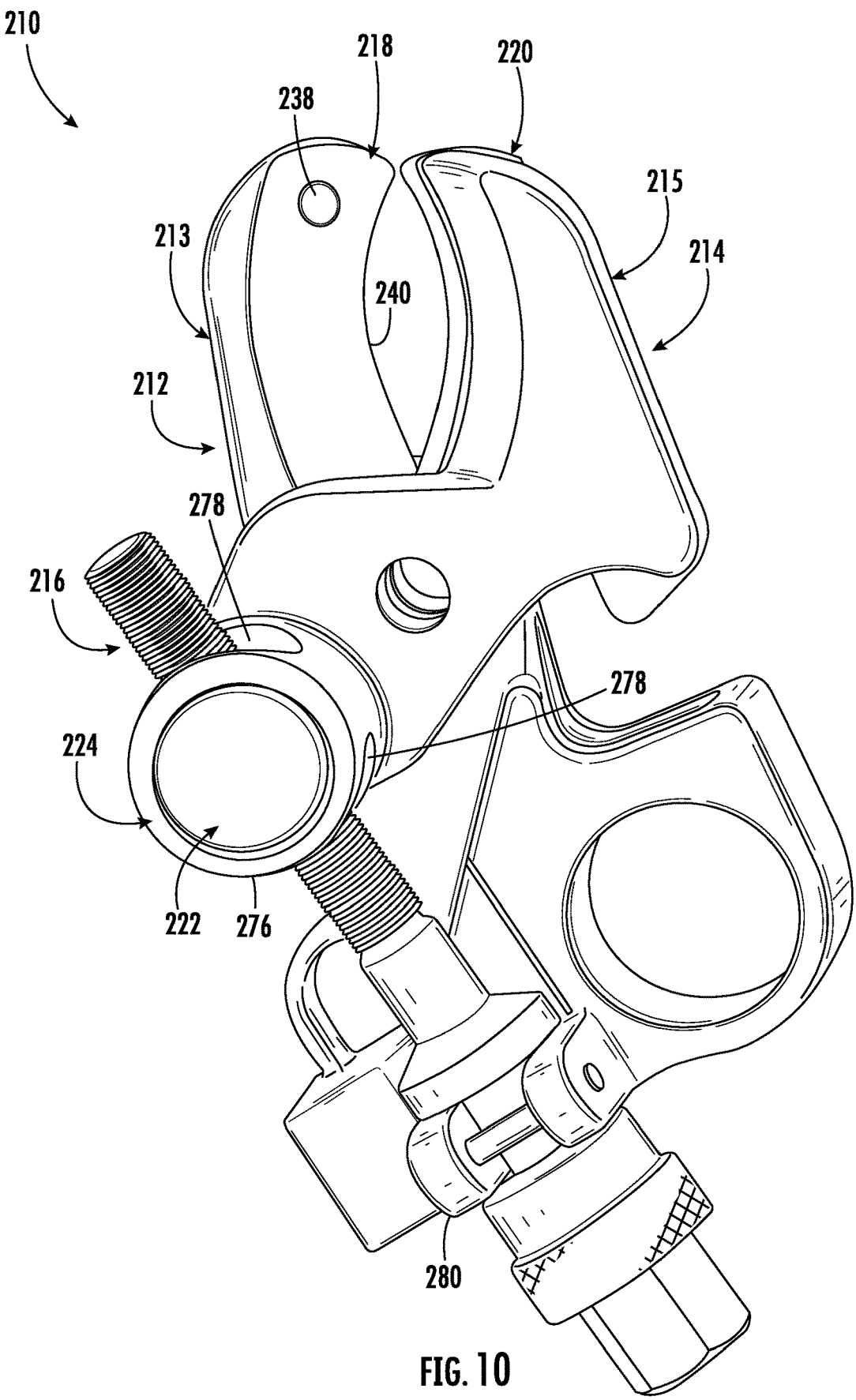
FIG. 10 is a perspective view of a third embodiment of a cable cutter and crimper having removable cutting elements and a pivot nut located within a collar.
Figure 11:
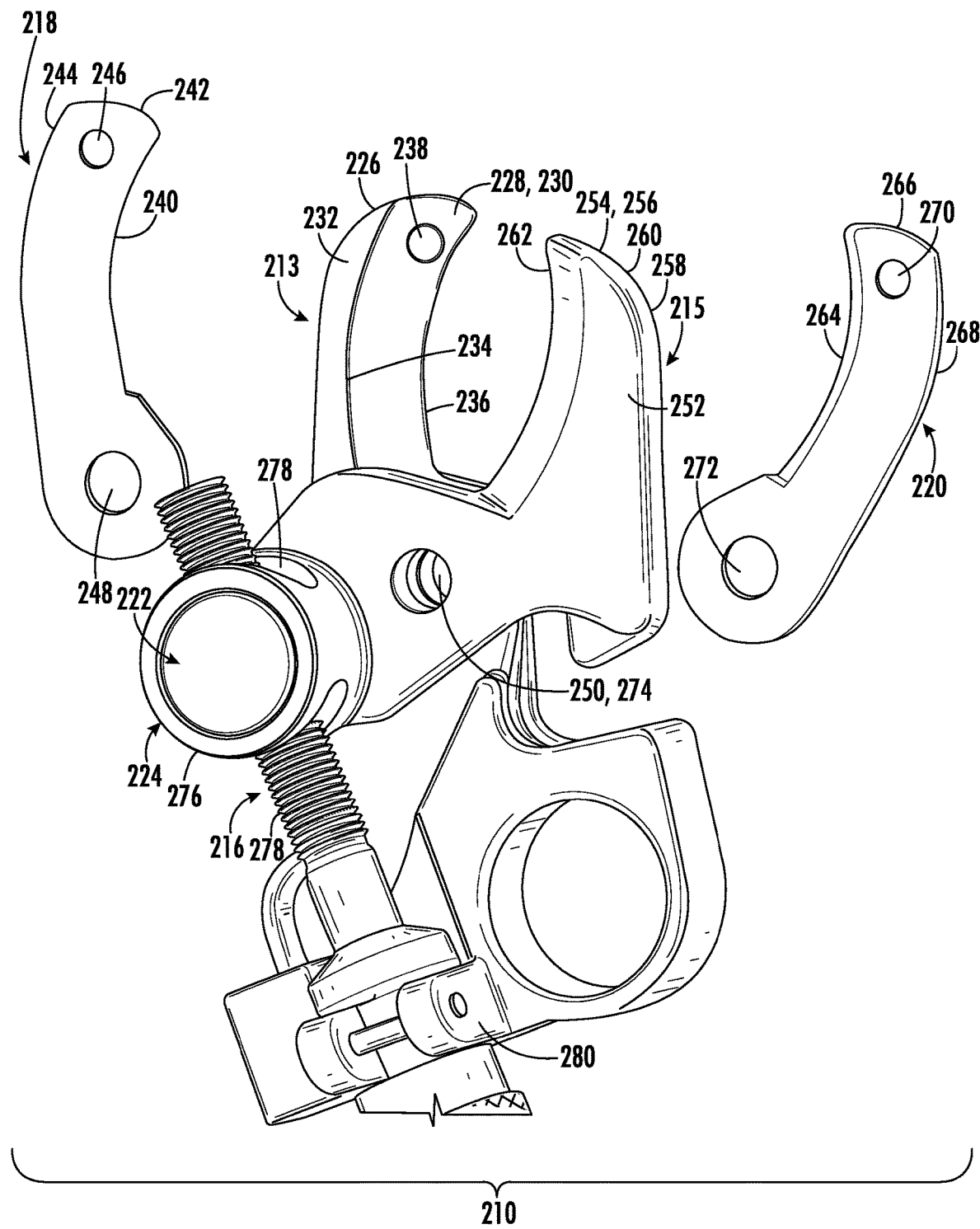
FIG. 11 is a partial exploded perspective view of the cable cutter and crimper depicted in FIG. 10.
Figure 12:
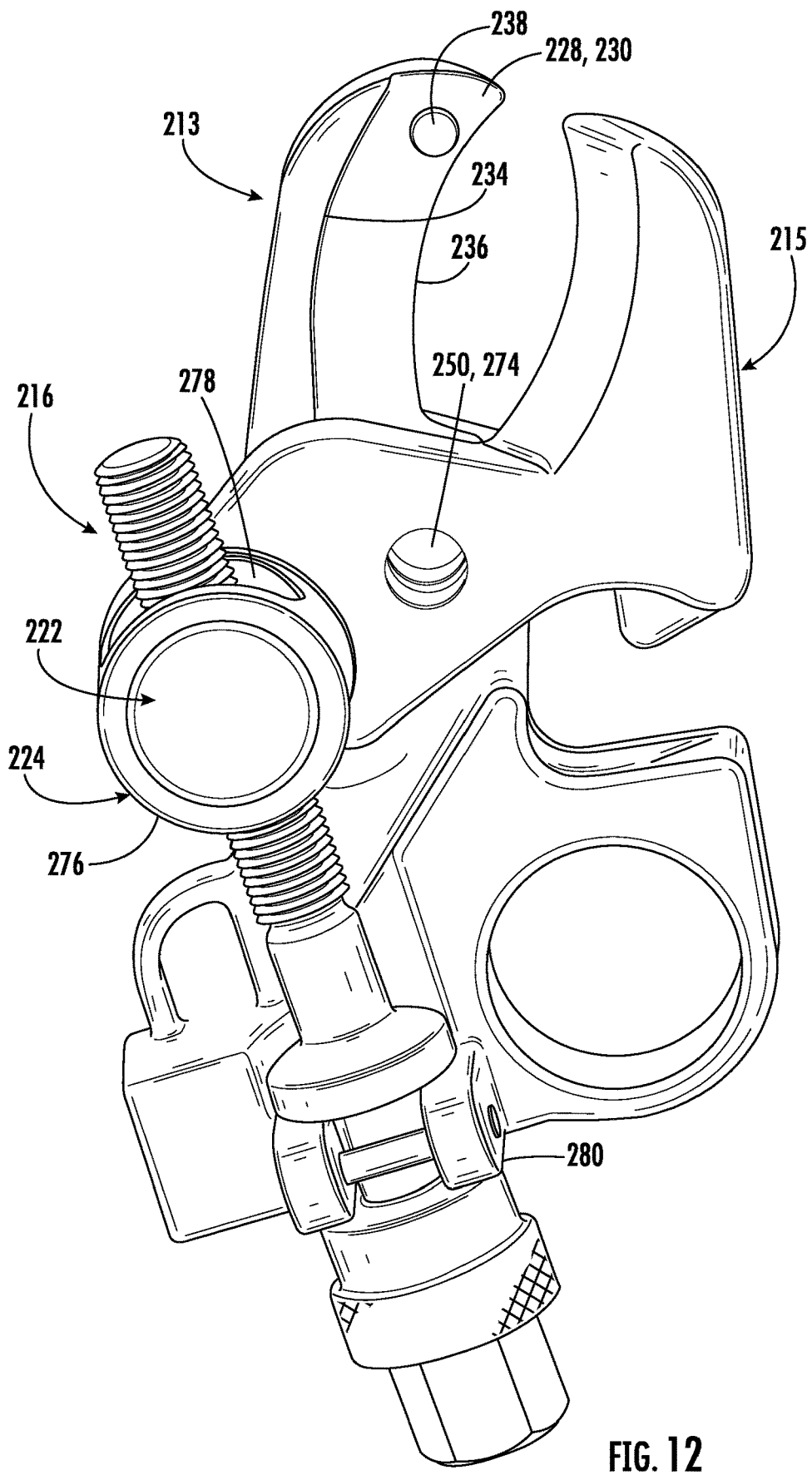
FIG. 12 is a perspective view of the cable cutter and crimper of FIG. 10 with the cutting elements removed.

Referring now to FIGS. 10-12, there is depicted another embodiment of a cable cutter and crimper 210 generally comprised of an anvil 212, a blade 214, and an actuator screw 216. The cable cutter and crimper 210 shown in FIGS. 10-12 differs from the cable cutter and crimpers discussed above by including removable cutting elements 218, 220 to allow for easy replacement thereof if the cutting elements 218, 220 become dull. Another distinguishable feature of the cable cutter and crimper 210 is a pivot nut 222 located within a collar 224, with the pivot nut 222 being pivotable within the collar 224 as the cable cutter and crimper 210 is transitioned between its open and closed positions.

The discussion below focuses on the distinguishable features of the cable cutter and crimper 210, with those features of the cable cutter and crimper 210 shared in common with the above-described cable cutter and crimpers being described in detail above.

The cable cutter and crimper 210 includes anvil 212 including a main body 213 having opposed first and second surfaces 226, 228, with the second surface 228 including a first region 230 and a second region 232 separated from each other by a shoulder 234. The first region 230 is recessed relative to the second region 232, which results in the thickness (i.e., the distance between the first and second surfaces 226, 228) being smaller at the first region 230 than the thickness in the second region 232. The first and second surfaces 226, 228 of the anvil 212 intersect to define an edge 236, which may not be configured to function as a cutting edge. In this respect, the edge 236 may be dull. The anvil 212 additionally includes a locating boss 238 extending outwardly from the first region 230. The locating boss 238 shown in FIGS. 10-12 is circular in shape, although the locating boss 238 may be formed in other shapes without departing from the spirit and scope of the present disclosure.

The anvil main body 213 may interface with anvil cutting element 218, which may be configured to extend over the first region 230 of the second surface 228. FIG. 10 shows the anvil cutting element 218 engaged to the anvil main body 213, FIG. 11 shows the anvil cutting element 218 disengaged from the anvil main body 213, while FIG. 12 shows the anvil main body 213 without the anvil cutting element 218. The anvil cutting element 218 includes an anvil cutting edge 240, a forward edge 242 and a shoulder abutment edge 244, with the forward edge 242 extending between the anvil cutting edge 240 and the shoulder abutment edge 244. The shoulder abutment edge 244 may be complementary in shape to the shoulder 234. The anvil cutting element 218 additionally includes an opening 246 sized to be complementary in shape to the locating boss 238 formed on the anvil main body 213. The anvil cutting element 218 may also include an attachment opening 248 alignable with an anvil opening 250 formed on the anvil main body 213. When the anvil cutting element 218 is engaged with the anvil main body 213, the locating boss 238 may be received in the opening 246, the shoulder abutment edge 244 may be placed adjacent the shoulder 234, and the attachment opening 248 is aligned with the anvil opening 250. The anvil cutting edge 240 may protrude beyond the edge 236 of the anvil main body 213 such that the anvil cutting edge 240 is positioned to cut a cable, rather than the edge 236.

The blade 214 includes a main body 215 including opposed first and second surfaces 252, 254, with the second surface 254 including a first region 256 and a second region 258 separated by a shoulder 260. The first region 256 is recessed relative to the second region 258, which results in the thickness (i.e., the distance between the first and second surfaces 252, 254) being smaller at the first region 256 than the second region 258. The first and second surfaces 252, 254 of the blade main body 215 intersect to define an edge 262, which may not be configured to function as a cutting edge. In this respect, the edge 262 may be dull. The blade main body 215 additionally includes a locating boss (not shown) extending outwardly from the first region 256.

The blade main body 215 may interface with blade cutting element 220, which may be configured to extend over the first region 256 of the second surface 254. FIG. 10 shows the blade cutting element 220 engaged to the blade main body 215, FIG. 11 shows the blade cutting element 220 disengaged from the blade main body 215, while FIG. 12 shows the blade main body 215 without the blade cutting element 220. The blade cutting element 220 includes a blade cutting edge 264, a forward edge 266 and a shoulder abutment edge 268, with the forward edge 266 extending between the blade cutting edge 264 and the shoulder abutment edge 268. The shoulder abutment edge 268 is sized and configured to be complementary to the shoulder 260 on the blade main body 215. The blade cutting element 220 additionally includes an opening 270 sized to be complementary in shape to the locating boss formed on the blade 214. The blade cutting element 220 may also include an attachment opening 272 alignable with the blade opening 274 formed on the blade 214. When the blade cutting element 220 is engaged with the blade 214, the locating boss may be received in the opening 272, the shoulder abutment edge 268 is placed adjacent the shoulder 260, and the attachment opening 272 is aligned with the blade opening 274.

The anvil cutting element 218 and blade cutting element 220 may be formed from a material which may differ from that of the anvil 212 and blade 214. In this regard, the anvil 212 and blade 214 may be formed from less expensive materials, as they may not interface directly with the cable when cutting the cable. As such, the anvil 212 and blade 214 may not need to be configured to withstand repeated sharpening to fix dull surfaces. Furthermore, the anvil cutting element 218 and blade cutting element 220 may be thin and disposable, such that when the cutting edges 240, 264 thereof become dull, the cutting elements 218, 220 may be quickly and easily replaced with new cutting elements 218, 220, rather than requiring sharpening of the existing cutting elements 218, 220.

The blade 214 additionally includes the collar 224 protruding from the first surface 252 thereof. The collar 224 includes an inner surface, an outer surface 276, and a pair of slots 278 extending circumferentially between the inner and outer surfaces 276. The inner surface may define a collar opening, and the slots 278 may be in communication with the collar opening and in diametrically opposed relation to each other. The slots 278 may be sized to accommodate pivoting motion of the actuator screw 216, as will be described in more detail below.

The pivot nut 222 may be sized to be received within the collar opening and also to engage with the threaded portion of the actuator screw 216. As such, the pivot nut 222 may include a threaded bore extending diametrically therethrough and sized to threadingly engage the actuator screw 216. The pivot nut 222 is received within the collar 224 such that the threaded bore is aligned with the pair of slots 278 formed in the collar 224. In this regard, the threaded bore may extend along a bore axis, which may extend through the pair of slots 278. The slots 278 are sized to allow the actuator screw 216, and pivot nut 222, to pivot relative to the collar 224 as the cable cutter and crimper 210 transitions between the closed and open positions. The pivot nut 22 may pivot about a pivot axis defined by the collar 224, with the collar 224 circumnavigating the pivot axis. Since the collar 224 is an integral part of the blade 214, the pivot axis moves with the blade 214 as the blade 214 is transitioned between the closed and open positions. Along these lines, the blade 214 pivots about the blade opening 274, and thus, since the pivot axis is spaced from the blade opening 274, the pivot axis also moves or pivots about the blade opening 274.

The engagement between the pivot nut 222, the collar 224, and the actuator screw 216 provides for a strong and sturdy connection capable of withstanding large forces encountered when cutting cable. In particular, the sidewalls of the pivot nut 222 may contact the inner surface of the collar 224, which may stabilize the pivot nut 22 to counteract the forces encountered during cable cutting operations.

As noted above, the pivoting motion of the actuator screw 216 is accommodated by the collar 224 and the diametrically opposed slots 278. Accordingly, actuator screw 216 may be more tightly held between clevis 280. In this regard, while the first embodiment of the cable cutter and crimper shown in FIGS. 1-4 was sized to allow the actuator screw to float relative to the clevis to accommodate the pivoting motion of the actuator screw, such spacing may not be needed for the embodiment shown in FIGS. 10-12, due to the incorporation of the collar 224 on the blade 214.

The particulars shown herein are by way of example only for purposes of illustrative discussion and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A cable cutter and crimper comprising:
an anvil having an anvil cutting edge;
a blade pivotally coupled to the anvil and having a blade cutting edge;
an actuator screw moveably coupled to the anvil and the blade;
a clevis coupled to the anvil and having a pair of arms extending on opposite sides of the actuator screw for coupling the actuator screw to the anvil; and
a pivot nut threadably coupled to the actuator screw and pivotally coupled to the blade;
wherein rotation of the actuator screw relative to the pivot nut in a first rotational direction causes the pivot nut to translate along the actuator screw in a first translation direction, resulting in the blade pivoting relative to the anvil to move the blade cutting edge away from the anvil cutting edge;
wherein rotation of the actuator screw relative to the pivot nut in a second rotational direction causes the pivot nut to translate along the actuator screw in a second translation direction, resulting in the blade pivoting relative to the anvil to move the blade cutting edge toward the anvil cutting edge.

2. The cable cutter and crimper recited in claim 1, wherein the clevis is integrally formed with the anvil.

3. The cable cutter and crimper recited in claim 1, wherein the clevis is pivotally coupled to the anvil.

4. The cable cutter and crimper recited in claim 3, wherein the anvil includes an opening sized to receive a portion of the clevis, the clevis being rotatable within the opening.

5. The cable cutter and crimper recited in claim 1, wherein the anvil includes a main body and an anvil cutting element engageable to the main body, the anvil cutting element including the anvil cutting edge.

6. The cable cutter and crimper recited in claim 1, wherein the blade includes a main body and a blade cutting element engageable with the main body, the blade cutting element including the blade cutting edge.

7. The cable cutter and crimper recited in claim 1, wherein the actuator screw includes a shaft, a flange extending radially outward relative to the shaft, and a body extending radially outward relative to the shaft and in positioned in spaced relation to the flange to define a void between the flange and the body.

8. The cable cutter and crimper recited in claim 7, further comprising a pin extendable between the pair of arms of the clevis and through the void to couple the actuator screw to the clevis.

9. The cable cutter and crimper recited in claim 1, wherein the pivot nut includes a main body and a boss engageable with the blade.

10. The cable cutter and crimper recited in claim 1, wherein the anvil includes an opening and the blade includes an opening alignable with the opening on the anvil, the blade being pivotable relative to the anvil about the aligned openings.

11. The cable cutter and crimper recited in claim 1, wherein the anvil includes a finger opening formed therein, the finger opening being sized to receive a finger of a user to facilitate manual gripping thereof.

12. The cable cutter and crimper recited in claim 1, wherein the anvil includes a cavity extending therein, the cavity being sized to receive a tool to facilitate engagement between the tool and the anvil.

13. The cable cutter and crimper recited in claim 1, wherein the blade includes a main body and a collar extending from the main body, the collar being sized to receive the pivot nut.

14. The cable cutter and crimper recited in claim 13, wherein the collar includes a pair of slots sized and configured such that a portion of the actuator screw extends through the pair of slots.

15. A cable cutter and crimper comprising:
an anvil having an anvil cutting edge;
a blade pivotally coupled to the anvil and having a blade cutting edge;
an actuator screw rotatably coupled to the anvil and the blade and defining a void;
a clevis coupled to the anvil and having a pair of arms extending on opposite sides of the actuator screw solely in the void thereof for coupling the actuator screw to the anvil; and
wherein rotation of the actuator screw relative to the blade in a first rotational direction causes the blade to pivot relative to the anvil to move the blade cutting edge away from the anvil cutting edge;
wherein rotation of the actuator screw relative to the blade in a second rotational direction causes the blade to pivot relative to the anvil to move the blade cutting edge toward the anvil cutting edge.

16. The cable cutter and crimper recited in claim 15, wherein the clevis is integrally formed with the anvil.

17. The cable cutter and crimper recited in claim 15, wherein the clevis is pivotally coupled to the anvil.

18. The cable cutter and crimper recited in claim 15, wherein the actuator screw includes a shaft, a flange extending radially outward relative to the shaft, and a body extending radially outward relative to the shaft and in positioned in spaced relation to the flange to define a void between the flange and the body.

19. The cable cutter and crimper recited in claim 15, wherein the blade includes a main body and a collar extending from the main body, the collar being sized to receive the pivot nut.

20. The cable cutter and crimper recited in claim 19, wherein the collar includes a pair of slots sized and configured such that a portion of the actuator screw extends through the pair of slots.

* * * * *